United States Patent
Barnette, Jr. et al.

(10) Patent No.: US 11,036,010 B2
(45) Date of Patent: Jun. 15, 2021

(54) FEMALE HARDENED OPTICAL CONNECTORS FOR USE WITH MALE PLUG CONNECTORS

(71) Applicant: CORNING OPTICAL COMMUNICATIONS LLC, Hickory, NC (US)

(72) Inventors: Robert Elvin Barnette, Jr., Hickory, NC (US); Hieu Vinh Tran, Charlotte, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/954,007

(22) Filed: Apr. 16, 2018

(65) Prior Publication Data
US 2018/0239094 A1     Aug. 23, 2018

Related U.S. Application Data

(63) Continuation of application No. 15/369,933, filed on Dec. 6, 2016, now Pat. No. 9,964,713, which is a
(Continued)

(51) Int. Cl.
*G02B 6/38* (2006.01)

(52) U.S. Cl.
CPC .......... *G02B 6/3887* (2013.01); *G02B 6/387* (2013.01); *G02B 6/389* (2013.01); *G02B 6/3871* (2013.01); *Y10T 29/49908* (2015.01)

(58) Field of Classification Search
CPC .... G02B 6/3887; G02B 6/387; G02B 6/3871; G02B 6/389; Y10T 29/49908
(Continued)

(56) References Cited

U.S. PATENT DOCUMENTS 4,872,736 A * 10/1989 Myers ................. G02B 6/3878
                                                        385/60
5,129,023 A     7/1992 Anderson et al.
(Continued)

FOREIGN PATENT DOCUMENTS

CN     1442712 A     9/2003
CN   101131452 A     2/2008
(Continued)

OTHER PUBLICATIONS

International Search Report of the International Searching Authority; PCT/US2014/017030; dated Jul. 7, 2014; 5 pages; European Patent Office.
(Continued)

*Primary Examiner* — Jerry M Blevins
(74) *Attorney, Agent, or Firm* — Michael E. Carroll, Jr.

(57) ABSTRACT

A female hardened fiber optic connector for terminating an end of a fiber optic cable that is suitable for making an optical connection with another hardened cable assembly and cable assemblies using the same are disclosed. The female hardened fiber optic connector includes a connector assembly, a crimp body, a connector sleeve, and female coupling housing. The connector sleeve has one or more orientation features that cooperate with one or more orientation features inside the female coupling housing. The crimp body has a first shell and a second shell for securing the connector assembly at a front end of the shells and a cable attachment region rearward of the front end for securing a cable.

57 Claims, 12 Drawing Sheets

Related U.S. Application Data continuation of application No. 13/833,176, filed on Mar. 15, 2013, now Pat. No. 9,513,444.

(60) Provisional application No. 61/769,251, filed on Feb. 26, 2013.

(58) Field of Classification Search
USPC .......................................................... 385/76
See application file for complete search history.

(56) References Cited

U.S. PATENT DOCUMENTS

| | | | |
|---|---|---|---|
| 5,214,732 | A | 5/1993 | Beard et al. |
| 5,971,626 | A | 10/1999 | Knodell et al. |
| 6,542,674 | B1 | 4/2003 | Gimblet |
| 7,090,406 | B2 | 8/2006 | Melton et al. |
| 7,113,679 | B2 | 9/2006 | Melton et al. |
| 7,744,286 | B2 | 6/2010 | Lu et al. |
| 9,140,858 | B2 | 9/2015 | Xiong et al. |
| 9,513,444 | B2 | 12/2016 | Barnette, Jr. et al. |
| 2005/0053342 | A1 | 3/2005 | Melton et al. |
| 2006/0045430 | A1 | 3/2006 | Theuerkorn et al. |
| 2006/0269194 | A1 | 11/2006 | Luther et al. |
| 2008/0044137 | A1 | 2/2008 | Luther et al. |
| 2008/0175541 | A1 | 7/2008 | Lu et al. |
| 2008/0175546 | A1 | 7/2008 | Lu et al. |
| 2008/0273837 | A1 | 11/2008 | Margolin et al. |
| 2008/0273855 | A1 | 11/2008 | Bradley et al. |
| 2008/0310796 | A1* | 12/2008 | Lu .................. G02B 6/3825 385/72 |
| 2008/0310798 | A1 | 12/2008 | Cody et al. |
| 2009/0136184 | A1* | 5/2009 | Abernathy ............ G02B 6/381 385/80 |
| 2009/0148102 | A1 | 6/2009 | Lu et al. |
| 2010/0133808 | A1* | 6/2010 | Castiglioni ........... F16L 13/142 285/108 |
| 2010/0284655 | A1 | 11/2010 | Nakano et al. |
| 2010/0322563 | A1 | 12/2010 | Melton et al. |
| 2013/0156379 | A1* | 6/2013 | Ott .......................... G02B 6/36 385/76 |

FOREIGN PATENT DOCUMENTS

| | | |
|---|---|---|
| CN | 101501544 A | 8/2009 |
| CN | 101907752 A | 12/2010 |
| CN | 101925841 A | 12/2010 |
| CN | 201707478 U | 1/2011 |
| CN | 201707485 U | 1/2011 |
| CN | 201852966 U | 6/2011 |
| CN | 201926783 U | 8/2011 |
| CN | 103278890 A | 9/2013 |
| EP | 1258758 A2 | 11/2002 |
| EP | 1258785 A2 | 11/2002 |
| EP | 1367419 B1 | 10/2007 |
| EP | 2220527 A2 | 8/2010 |
| EP | 2159616 B1 | 6/2013 |
| JP | 62054105 A | 3/1987 |
| WO | 2008021351 A2 | 2/2008 |
| WO | 2009/076364 A2 | 6/2009 |
| WO | 2009073500 A1 | 6/2009 |
| WO | 2009131993 A1 | 10/2009 |

OTHER PUBLICATIONS

Chinese Patent Application No. 201810380701.0; English Translation of the First Office Action dated Sep. 4, 2019; China Patent Office; 8 Pgs.

English Translation of CN201810380701.0 Office Action dated Jun. 2, 2020; 10 pages; Chinese Patent Office.

Chinese Patent Application No. 201810380701.0 Supplementary search Report dated Nov. 6, 2020; 3 Pages (2 Pages of English Translation and 1 page of Original Document) Chinese Patent Office.

Chinese Patent Application No. 201810380701.0; Office Action dated Nov. 19, 2020; 16 Pages (7 pages of English Translation and 9 pages of Original Office Action); Chinese Patent Office.

Chinese Patent Application No. 201810380701.0, Notice of Allowance dated Mar. 12, 2021, 4 pages (English Translation Only); Chinese Patent Office.

* cited by examiner

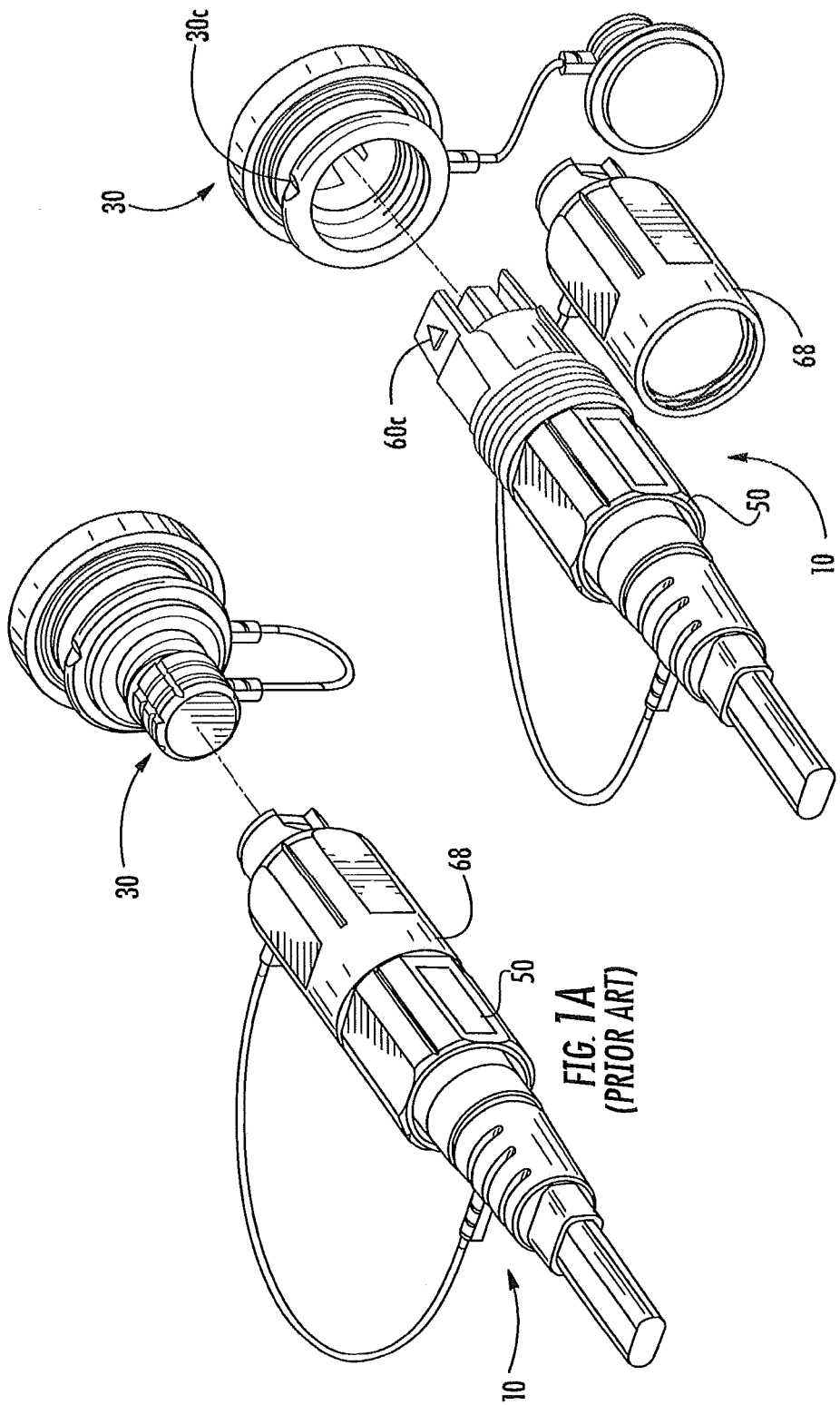

FEMALE HARDENED OPTICAL CONNECTORS FOR USE WITH MALE PLUG CONNECTORS

PRIORITY

This application is a continuation of U.S. patent application Ser. No. 15/369,933, filed Dec. 6, 2016, which is a continuation of U.S. patent application Ser. No. 13/833,176, filed Mar. 15, 2013, issued as U.S. Pat. No. 9,513,444, on Dec. 6, 2016, and which claims the benefit of priority under 35 U.S.C, § 119 of U.S. Provisional Application Ser. No. 61/769,251, filed Feb. 26, 2013, the content of which is relied upon and incorporated by reference in their entirety.

BACKGROUND

The disclosure is directed to female hardened optical connectors and cable assemblies using the same. More specifically, the disclosure is directed to female hardened optical connectors used for making an optical connection with a hardened male plug connector.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection.

FIGS. 1A-1C are prior art depictions showing various stages of mating of a preconnectorized cable 10 having an OptiTap® male plug connector with a receptacle 30. Receptacle 30 that receives the OptiTap® male plug connector has a first end (not visible) that receives a standard SC connector (i.e., a non-hardened receptacle port) and a second end (visible) having a hardened receptacle port for receiving the OptiTap® male plug connector, thereby making an optical connection between a hardened connector and a non-hardened connector. Receptacle 30 typically is mounted in a wall of an enclosure or the like with a first end typically disposed inside an enclosure for environmental protection and the second end extends outward of the enclosure for connectivity. Simply stated, receptacle 30 has a first side with a non-hardened receptacle port and a second side with a hardened receptacle port for receiving the OptiTap® male plug connector. Thus, receptacle 30 can optically connected the hardened OptiTap® male plug connector with a non-hardened connector such as a standard SC connector. Consequently, a network operator can make an optical connection between a robust outdoor fiber optic cable assembly to a less robust indoor cable assembly as known in the art.

Due to installation space available, right-of-way, complexity issues and the like, some installations require network providers to provide third party access to an existing network so the subscriber may choose among network operators (i.e., a multi-operator option), instead of running entirely new cabling to the subscriber. Thus, a third party operator may need to connect a new subscriber to their network who already has an existing drop cable installed and routed to the premises of the subscriber. Consequently, there exists an unresolved need for hardened cable assemblies that can connector subscribers to third party network operators in a quick and reliable manner.

SUMMARY

The disclosure is directed to female hardened fiber optic connectors including a connector assembly, a body having first shell and a second shell for securing the connector assembly at a front end of the shells and a cable attachment region rearward of the front end, a connector sleeve having a passageway between a first end and a second end along with one or more connector sleeve orientation features and a female coupling housing. The female coupling housing has an opening with an internal attachment feature along with one or more coupling housing orientation features that cooperate with the one or more connector sleeve orientation features. The female hardened fiber optic connectors can be mated directly to a male hardened connector such as the OptiTap male plug connector.

The disclosure is also directed to a hardened fiber optic connector assembly including a fiber optic cable having at least one optical fiber and a female hardened fiber optic connector attached to the at least one optical fiber of the fiber optic cable. The female hardened fiber optic connector includes a connector assembly having a crimp body with a first shell and a second shell for securing a connector assembly at a front end of the shells and a cable attachment region rearward of the front end, a connector sleeve having a passageway between a first end and a second end and including one or more connector sleeve orientation features along with an orientation rail disposed within the passageway, and a female coupling housing having an opening with an internal attachment feature along with one or more female coupling housing orientation features that cooperate with the one or more connector sleeve orientation features for aligning the connector sleeve inside the female coupling housing.

The disclosure is further directed to a method of making a hardened fiber optic connector assembly, comprising the steps of providing a fiber optic cable having at least one optical fiber, providing a female hardened fiber optic connector that includes a connector assembly with a crimp body having a first shell and a second shell for securing the connector assembly at a front end of the shells and a cable attachment region rearward of the front end, providing a connector sleeve having a passageway between a first end and a second end and that includes one or more connector sleeve orientation features, attaching the at least one optical fiber to the connector assembly, securing the connector assembly between the first shell and second shell, and placing the connector assembly, crimp body and connector sleeve into a female coupling housing.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C show portions of a conventional preconnectorized fiber drop cable having an OptiTap® male plug connector being inserted into and connected with a conventional receptacle;

DETAILED DESCRIPTION

Reference will now be made in detail to the embodiments of the disclosure, examples of which are illustrated in the accompanying drawings. Whenever possible, like reference numbers will be used to refer to like components or parts.

The female hardened fiber optic connectors and cable assemblies described herein are suitable for making optical and/or optical-electrical connections (if electrical connections are included in the connectors) to a conventional male hardened connector such as the OptiTap® male plug connector. Although the concepts disclosed herein are explained with respect to a female hardened fiber optic connector used for optical connection with an OptiTap connector, the concepts disclosed may be used with other hardened connectors and are not limited to this particular optical connection. The concepts of the disclosure advantageously allow the simple, quick, and economical cable assemblies for deployment by the craft in the field so a subscriber with an existing drop cable may be connected to a third party network for service or the like. Reference will now be made in detail to the embodiments, examples of which are illustrated in the accompanying drawings. Whenever possible, like reference numbers will be used to refer to like components or parts.

Figure 1C:
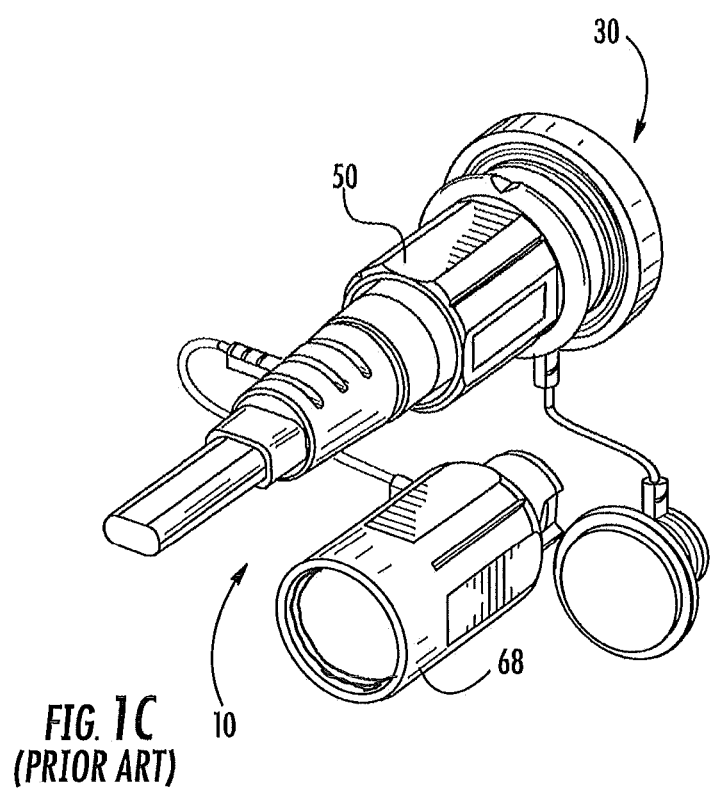
Figure 2:
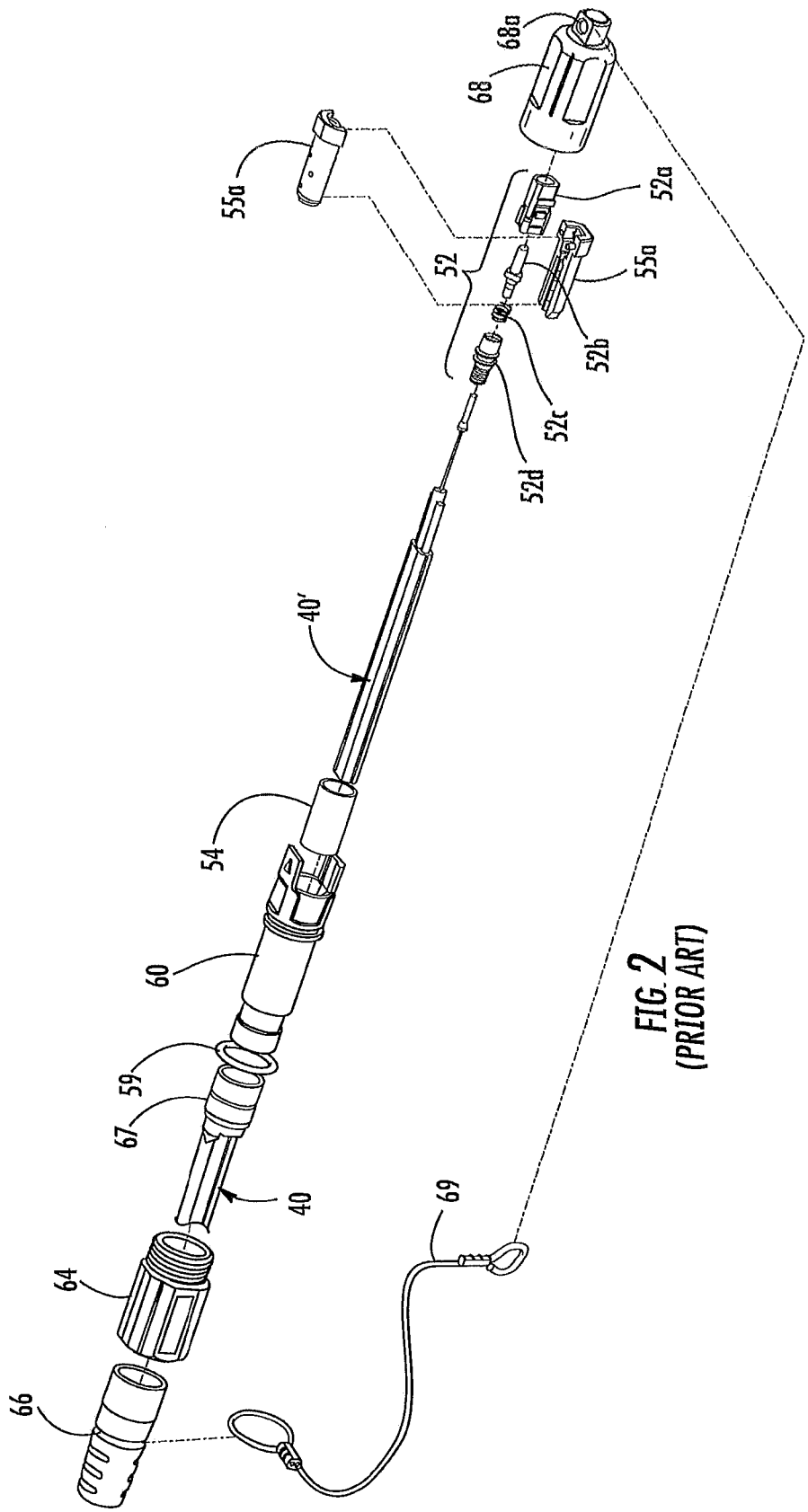
FIG. 2 is a partially exploded view of a preconnectorized cable assembly using the conventional OptiTap® male plug connector of FIGS. 1A-1C.

FIG. 2 depicts a partially exploded view of a preconnectorized cable assembly 10 having the conventional OptiTap® male plug connector 50 depicted in FIGS. 1A-1C for attachment to cable 40'. Fiber optic cable 40' is disclosed in U.S. Pat. No. 6,542,674, the contents of which are incorporated herein by reference. Conventional male plug connector 50 includes an industry standard SC type connector assembly 52 having a connector body 52a, a ferrule 52b in a ferrule holder (not numbered), a spring 52c, and a spring push 52d. Conventional male plug connector 50 also includes a crimp assembly (not numbered) that includes a crimp housing having at least one shell 55a and a crimp band 54, a shroud 60 having one or more O-rings 59, a coupling nut 64 having external threads, a cable boot 66, a heat shrink tube 67, and a protective cap 68 secured to boot 66 by a wire assembly 69. Male plug connector 50 is a typical hardened connector used for drop cable assemblies to subscribers.

Figure 3:
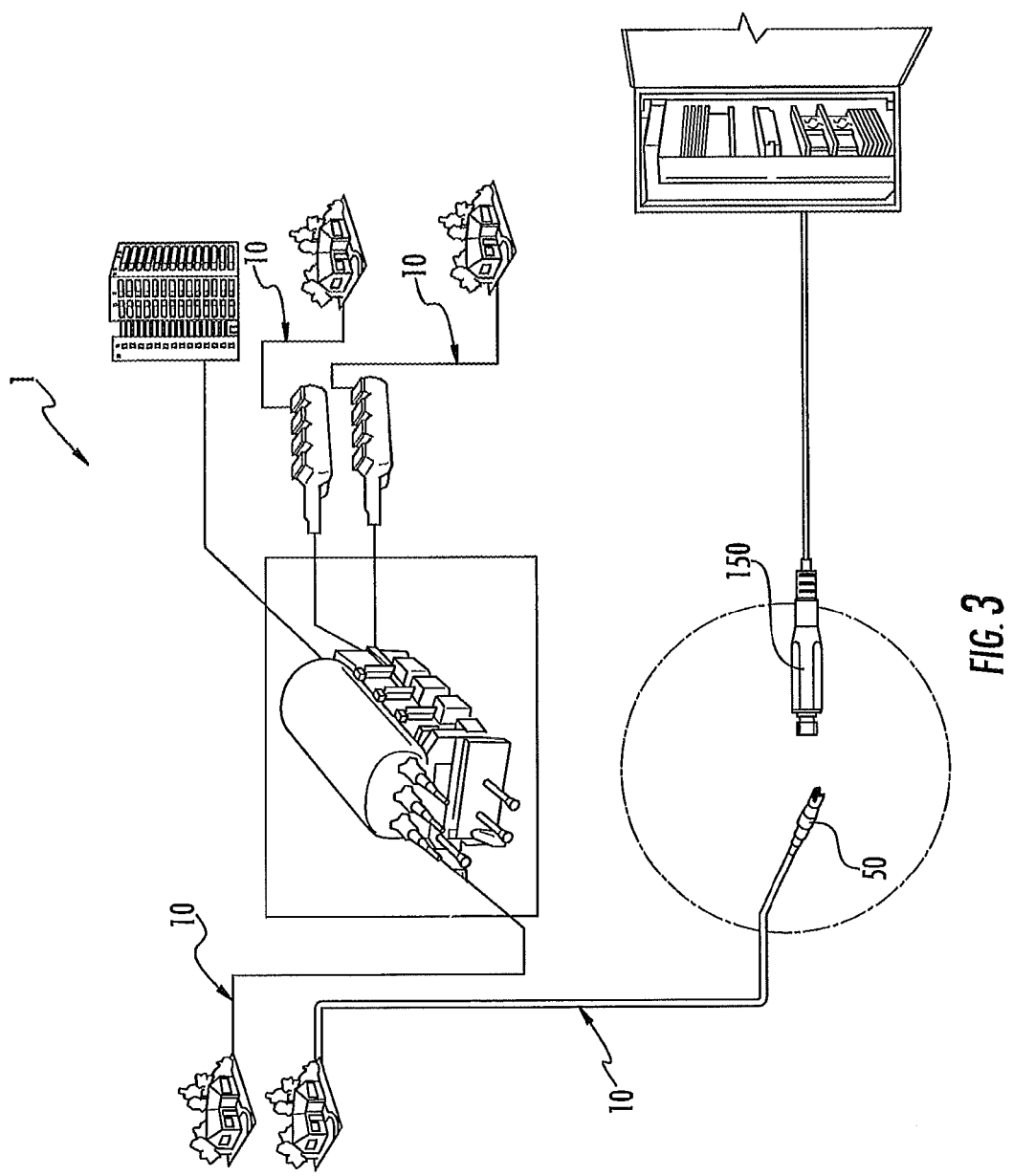
FIG. 3 is simplified schematic of a portion of an optical network showing a preconnectorized female hardened connector that is suitable for optical connection with the conventional OptiTap® male plug connector.

FIG. 3 depicts a simplified schematic showing a portion of a multi-operator optical waveguide network 1 in an exemplary fiber to the location 'x' (FTTx). 'x' in the acronym represents the end location of the optical waveguide, for instance, FTTC is fiber to the curb. In this case, the network 1 is a fiber to the premises (FTTP) application. FTTP architectures advantageously route at least one optical waveguide to the premises, thereby providing a high bandwidth connection to the subscriber. Moreover, applications to locations other than to the curb or premises are also possible. Downstream from a central office CO, network 1 includes one or more links that connect to a network access point (NAP) in the network such as an aerial closure (such as depicted in the rectangle), multiport, or the like. As shown, drop link comprises a preconnectorized fiber optic drop cable 10 (hereinafter preconnectorized cable) suitable for outdoor environments that is routed to the NAP of a first service provider for optical connection. The NAP typical uses a receptacle having a first side with a hardened receptacle port that extends externally of NAP and a second side having a non-hardened receptacle port that extends within the NAP and is protected from the outdoor environment. However, a subscriber may wish to receive service from a different (i.e., second) service provider (i.e., a competitor installation) using the existing drop cable running to the premises, instead of the first service provider. Consequently, the OptiTap® male plug connector 50 of the drop link needs to be connected to a suitable interface. The concepts of the present application provide a female hardened optical connector 150 along with preconnectorized cable assemblies using the female hardened connector that efficiently and economically streamlines the deployment and installation for multi-operator solutions into the last mile of the fiber optic network such as to the premises so that the craft can easily change service providers. Although, network 1 shows a simplified configuration of one type of FTTx architecture, other networks can employ the concepts disclosed herein. Other networks may include other suitable components such as distribution closures, amplifiers, couplers, transducers, or the like. Likewise, other networks besides FTTx architectures can also benefit from the concepts disclosed.

As shown, FIG. 3 depicts preconnectorized cable assemblies 10 having conventional male plug connectors 50 as drop cable assemblies for optical connection to subscribers 5. For multi-operator networks, the third party operator may need to connect to an existing conventional male plug connector 50. The present application discloses female hardened connectors 150 suitable for optical connection with the male hardened connector 50 of preconnectorized cable assembly 10.

As depicted by FIG. 3, the third party operator may only have access to connect the new subscriber by making the optical connection with the existing male hardened connector that is already routed to the subscriber. In other words, the drop cable to the subscriber is disconnected (i.e., unplugged) from the first network operated by a first network operator at a NAP terminal such as a multi-port or aerial disclosure. Thereafter, if the subscriber wishes to use a different third-party network operator to provide new service they must connect to the existing drop due to right-of-way, convenience, or other concerns.

Figure 4:
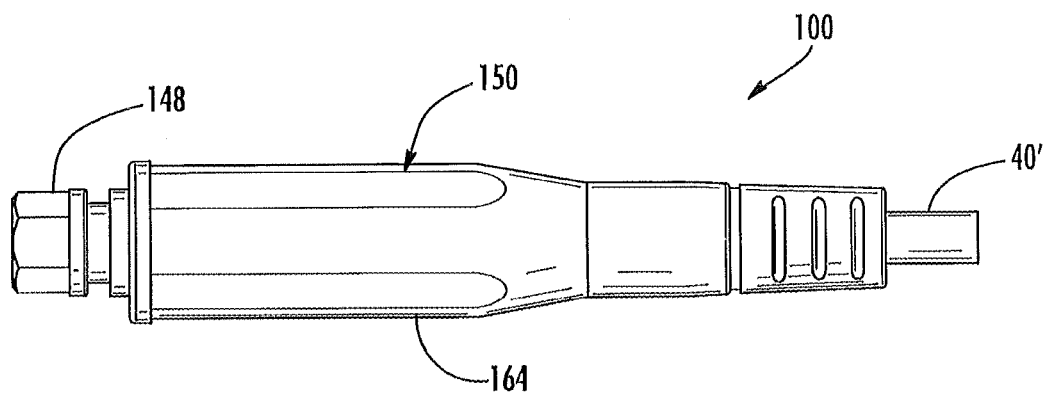
FIG. 4 is a close-up side view of a female hardened connector attached to a fiber optic cable according to the concepts disclosed herein.

FIG. 4 is side view of a preconnectorized cable assembly having a female hardened connector 150 attached to a fiber optic cable 40', thereby forming a hardened fiber optic cable assembly 100. Female hardened connector 150 also has a dust cap 148 attached thereto via a female coupling housing 164. Consequently, the female hardened fiber optic cable assembly 100 may be optically coupled with an OptiTap® male plug connector if a change in service providers is desired. Simply stated, the existing drop link 10 of FIG. 3 may be disconnected from the NAP or other location and then the hardened male plug such as the OptiTap® male plug connector 50 or the like may be optically connected to the female hardened cable assembly 100 having the female hardened connector 150 of the present application by removing dust cap 148 and then directly attaching male plug connector 50. Stated another way, the female coupling housing 164 is sized for receiving the male OptiTap plug connector 50 within the front end opening for direct optical mating. Female hardened connector 150 has a relatively small form factor and aligns the male plug connector 50 in the proper orientation so it may only mates in one direction. Further, the optical coupling between the female hardened connector 50 and the male OptiTap plug connector 50 is environmentally sealed.

Figure 5:
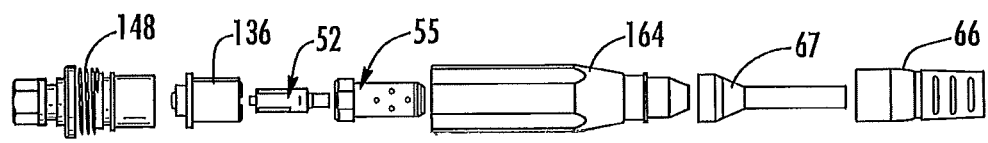
FIG. 5 is an exploded view of the female hardened connector of FIG. 4.
Figure 6:
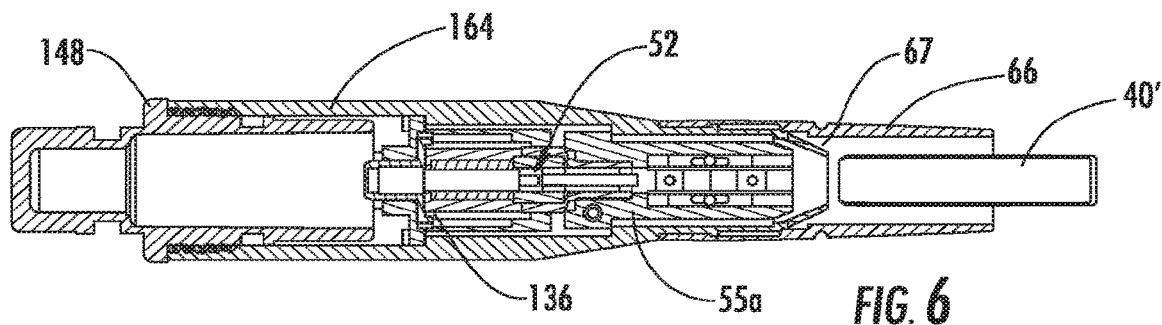
FIG. 6 is a cross-sectional view of the assembled female hardened connector depicted in FIGS. 4 and 5.

FIG. 5 is an exploded view and FIG. 6 is a cross-sectional view of the female hardened connector 150 of FIG. 4. Female hardened connector 150 includes connector assembly 52, a crimp body 55 having at least one shell 55a (as shown two shells 55a that form the crimp body) and an optional crimp band (not shown), a connector sleeve 136, a female coupling housing 164, along with a cable boot 66, and a heat shrink tube 67. For complexity reduction and simplification, the female hardened connector 150 can use many of the same parts as the OptiTap® male plug connector 50 or other standard parts as desired; however, certain components are specific female hardened connector 150. By way of example, female hardened connector 150 includes an industry standard SC type connector assembly 52 or the like having a connector body 52a, a ferrule 52b in a ferrule holder (not numbered), a spring 52c, and a spring push 52d, like to the OptiTap® male plug connector. Although, the term crimp body is used the body does not require crimp or crimp band and may use other securing means such as adhesive or the like for securing the shells 55a together. The connector may also include a dust cap 148, but other suitable configurations are possible using fewer or more components. For instance, female hardened connector 150 may also include an optional lanyard for the dust cap 148 as desired so it is prevented from being lost or separated from the assembly.

Generally speaking, most of the components of female plug connector 150 are formed from a suitable polymer, but other materials such as metal are possible. In one example, the polymer is a UV stabilized polymer such as ULTEM 2210 available from GE Plastics if the component is exposed to the elements; however, other suitable polymer materials are possible. For instance, stainless steel or any other suitable metal may be used for various components as desired.

Figure 7:
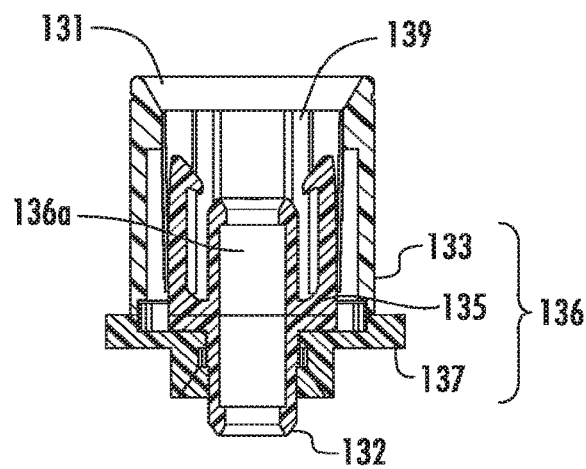
FIG. 7 is a cross-sectional view of the connector sleeve of the female hardened connector depicted in FIG. 5.
Figure 8:
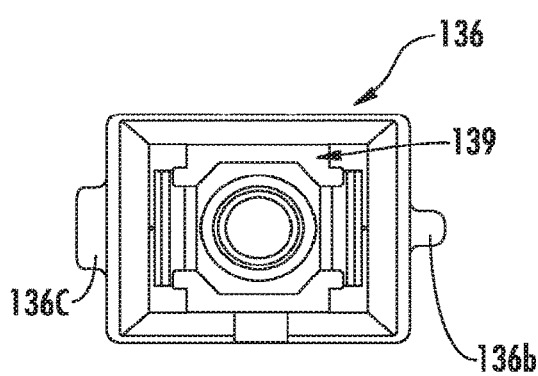
FIGS. 8 and 9 respectively are a front view and a front perspective view of the connector sleeve of the female hardened connector of FIGS. 4 and 5.
Figure 9:
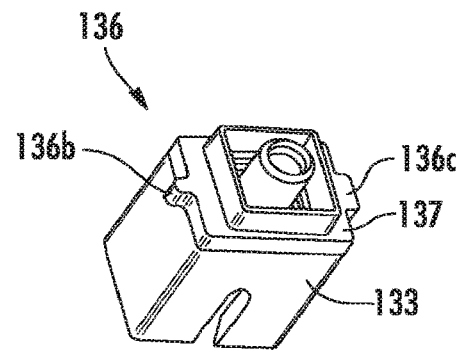
Figure 10:
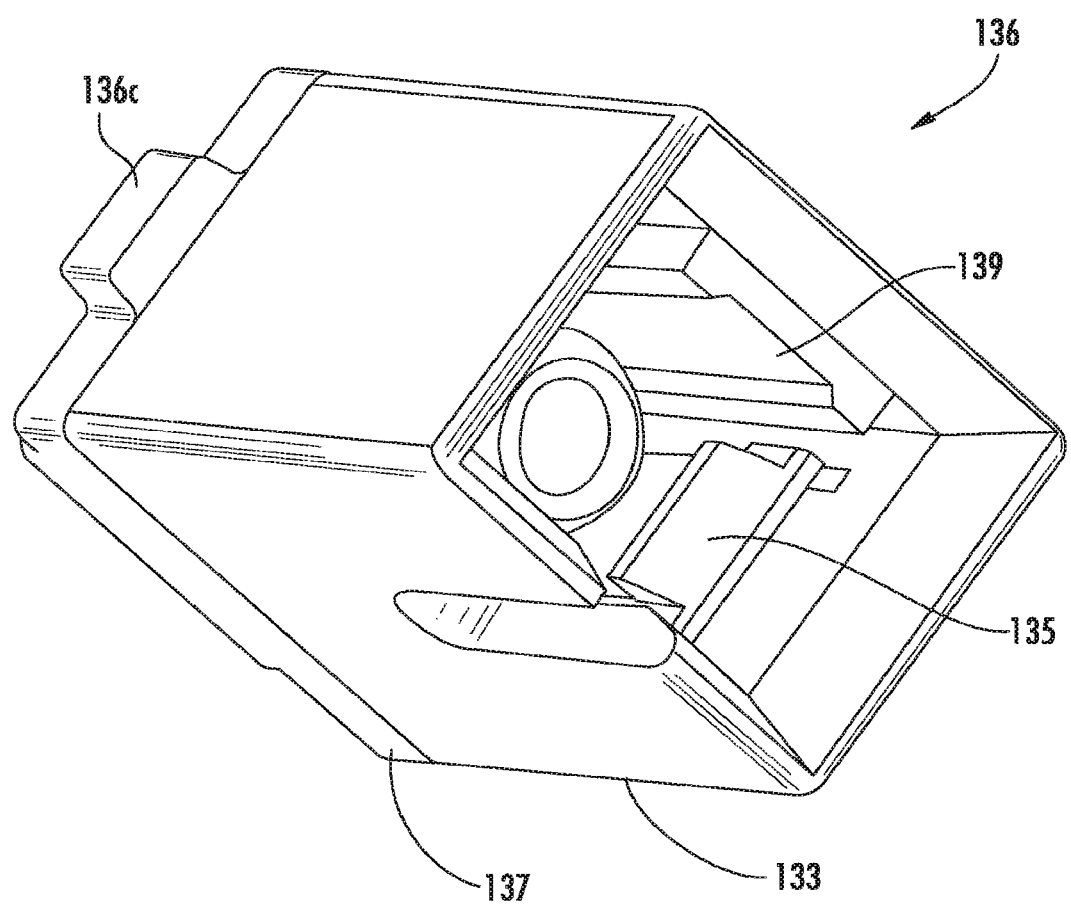
FIG. 10 is a rear perspective view of the connector sleeve of the female hardened connector of FIGS. 4 and 5.

FIGS. 7-10 are various views of connector sleeve 136. Specifically, FIG. 7 is a cross-sectional view of connector sleeve 136 and FIGS. 8 and 9 respectively are front and perspective views of connector sleeve 136. FIG. 10 is a rear perspective view of the connector sleeve 136. Connector sleeve 136 may be formed as a single component or formed as an assembly of more than one component. In this embodiment, connector sleeve 136 is formed from several components, thereby making the features of the connector sleeve easier manufacture.

As shown in FIG. 7, connector sleeve 136 has a through passageway from a first end 131 to a second end 132 for receiving and aligning respective ferrules of the male plug connector 50 and the female hardened connector 150 when mated. Specifically, when assembled, connector sleeve 136 fits within female coupling housing 164 and is used for aligning ferrule 52b of the female hardened plug connector 150 with the corresponding ferrule of the male plug connector 50. As best shown in FIG. 7, connector sleeve 136 includes a body 133, an alignment sleeve 135, and a cap 137. As depicted, alignment sleeve 135 has a portion disposed within body 133 and is secured therein by cap 137. Specifically, a flange (not numbered) of alignment sleeve 135 is aligned to body 133 using a recess portion of body 133 and cap 137 is attached to the body 133 for capturing and securing the flange of the alignment sleeve 135 between the body 133 and cap 137.

In addition to the connector sleeve 136 having a passageway 136a between the first end 131 and the second end 132 it also includes one or more connector sleeve orientation features. Connector sleeve orientation features can have many different suitable constructions such as lugs, tabs, openings, etc. for cooperating with the one or more female coupling housing orientation features on the female coupling housing. In the embodiment illustrated, connector sleeve 136 includes a first lug and a second lug for fitting the connector sleeve 136 into the female coupling housing 164. Stated another way, connector sleeve 136 fits into female coupling housing 164 in only one orientation using first tab 136b and second tab 136c having different shapes as discussed below.

Figure 16:
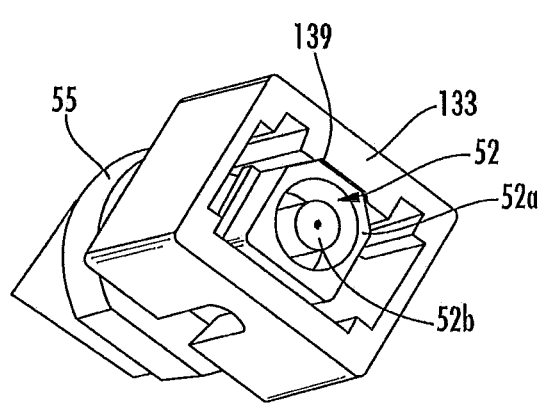
FIG. 16 is a partial perspective view showing the orientation between a portion of the connector sleeve and the connector assembly of the female hardened connector.

As best shown in FIG. 10, connector sleeve 136 optionally includes an orientation rail 139 for allowing connector assembly 52 of female hardened plug connector 150 to be assembled into the connector sleeve 136 in only a single orientation. As shown in FIG. 16, orientation rail 139 has a profile that only allows a narrow end of connector body 52a to abut the orientation rail 139 during assembly.

Figure 11:
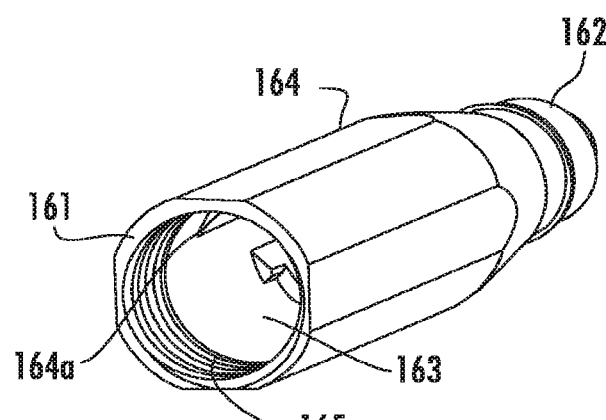
FIG. 11 is a perspective view of the female coupling housing of the female hardened connector of FIGS. 4 and 5.
Figure 12:
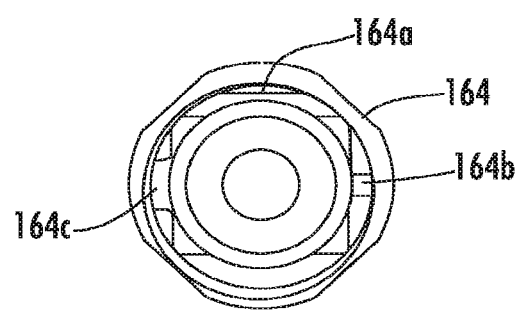
FIGS. 12 and 13 respectively are a front end view and a front perspective view of the female coupling housing of FIG. 11.
Figure 13:
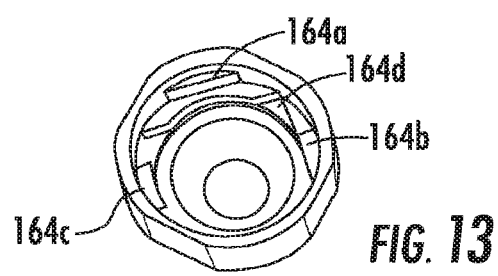
Figure 15:
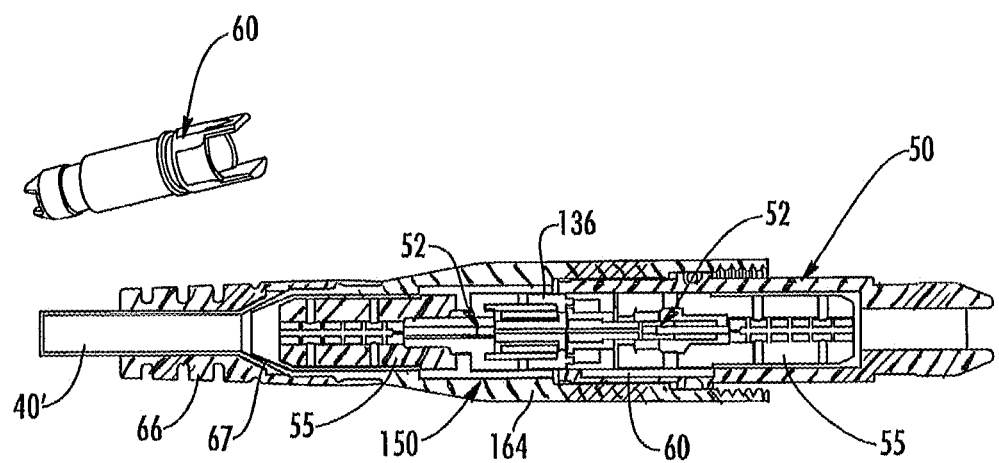
FIG. 15 is a cross-sectional view showing the female hardened connector of FIG. 4 connected to the conventional OptiTap® male plug connector.

FIGS. 11-13 depict various views of female coupling housing 164. Specifically, FIGS. 11 and 12 respectively are a perspective and front view of the female coupling housing 164 and FIG. 13 is perspective view looking into the front end opening for showing details inside the female coupling housing 164. Female coupling housing 164 has an elongate structure with a passageway 163 extending from the opening at a front end 161 to a rear end 162 and sized so that the shroud 60 of OptiTap male plug connector 50 fits into the front end 161 of passageway 163 when properly aligned. Consequently, male plug connector 50 may be directly mated with the female hardened connector 150 for making an optical connection therebetween such as shown in FIG. 15. As shown, female coupling housing 164 includes a first portion at the front end that necks down to a second portion at the rear end. The first portion includes the internal attachment feature such as internal threads 165 that cooperate directly with the complimentary external threads of male plug connector 50. Once the male plug connector 50 is attached to the female hardened connector 150 the assembly is suitable for making an optical connection therebetween such as for a third-party network operator to provide service over a previously installed drop cable.

Female coupling housing 164 includes features for aligning and securing connector sleeve 136 along with alignment features for correctly orientating male plug connector 50. As depicted, female coupling housing 164 includes a stop ledge 164a integrally formed in a side wall (i.e., disposed on the side wall) that is disposed rearward of internal threads 165. Stop ledge 164a is configured so that it only allows the shroud 60 of male plug connector 50 to fully seat within the female coupling housing 164 in one orientation for keying the optical coupling. In other words, the shroud 60 of the OptiTap male plug connector 50 has alignment fingers having different shapes and the stop ledge 164a only allows the male plug connector 50 to fully seat for optical coupling in one orientation by preventing insertion of the larger alignment finger into the female coupling housing 164 past the stop ledge 164a. Female coupling housing 164 also includes a shelf (not numbered) within the passageway and disposed rearward of the stop ledge 164a. Shelf 164d has a complementary shape for receiving connector sleeve 136 and includes a first retention feature 164b and a second retention feature 164c. Shelf 164d has a generally rectangular shape that cooperates with the generally rectangular shape of connector sleeve 136 so that it fits within the passageway of female coupling housing 164. As best shown in FIG. 13, first retention feature 164b and second retention feature 164c have different sizes that cooperate with tabs 136b,136c disposed on connector sleeve 136 so that it may only fully seat into shelf 164d in one orientation. Further, the stop ledge 164a has a specific orientation relative to first retention feature 164b and second retention feature 164c.

Figure 14:
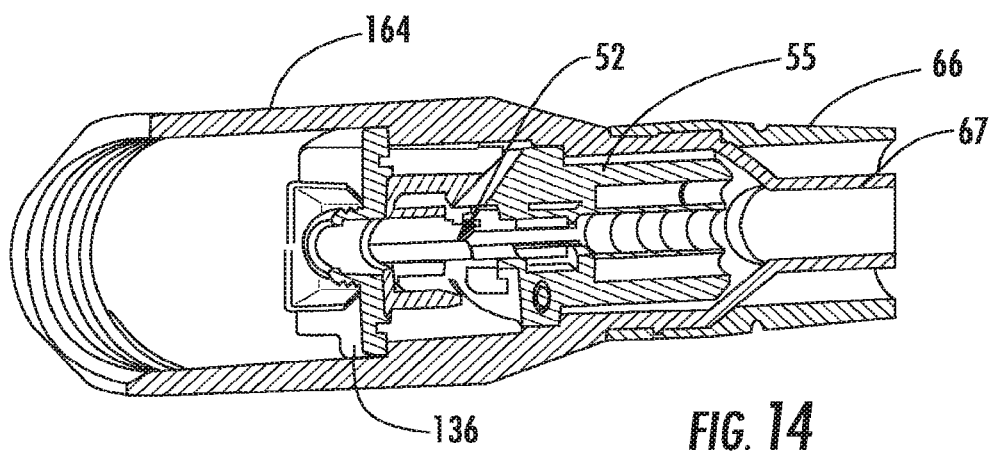
FIG. 14 is a perspective cut-away assembled view of the assembled female hardened connector of FIGS. 4 and 5 with the dust cap removed.

FIG. 14 is a perspective cut-away assembled view of female hardened connector 150 with the dust cap removed for showing assembly details. When fully assembled the crimp body 55 fits into female coupling housing 164 and is keyed to direct the insertion of the same into the coupling housing 164 in the correct orientation. In this case, shells 55a include planar surfaces on opposite sides of crimp body 55 to inhibit relative rotation between crimp body 55 and female coupling housing 164. In other embodiments, the crimp body 55 may be keyed to the female coupling housing 164 using other configurations such as a complementary protrusion/groove or the like.

Rear end 162 of coupling housing 164 includes second portion (not numbered). The second portion is used for securing heat shrink tubing 67 for providing environmental protection between the coupling housing 164 and the fiber optic cable 40' and weatherproofing the preconnectorized cable assembly. The other end of heat shrink tubing 67 is disposed about a portion of the cable jacket, thereby inhibiting water from entering female hardened connector 150. Further, the second portion allows for the attachment of boot 66 to the rear end 162 of coupling housing 164. After the heat shrink tubing 67 is attached, boot 66 may be slid over heat shrink tubing 67. Specifically, boot 66 may be positioned over the shrink tubing 67 at rear end 162 of female coupling housing 164 for providing further bending strain relief for the cable assembly.

Boot 66 may be formed from a flexible material such as KRAYTON or the like. Heat shrink tubing 67 and boot 66 generally inhibit kinking and provide bending strain relief to the cable 40' near female hardened connector 150. Boot 66 has a longitudinal passageway (not visible) and may have a stepped profile therethrough. The first end of the boot passageway is sized to fit over the heat shrink tubing 67. The first end of the boot passageway has a stepped down portion sized for cable 40' or other suitable cable that may be used and the heat shrink tubing 67 and acts as stop for indicating that the boot is fully seated. Dust cap 68 has external threads for engaging the internal threads of female coupling housing 164 for attachment and thereby inhibit dirt and debris from entering the female hardened connector 150 via the front end 161 of female coupling housing 164. Moreover, the cap may include an O-ring for providing a weatherproof seal between female hardened connector 150 and dust cap 68 when installed.

FIG. 15 is a cross-sectional view showing the female hardened connector 150 mated to the OptiTap® male plug connector 50. As shown, the shroud 60 of the OptiTap male plug connector 50 has alignment fingers having different shapes and when mated the stop ledge 164a only allows the male plug connector 50 to fully seat for optical coupling in one orientation by preventing insertion of the larger alignment finger into the female coupling housing 164 past the stop ledge 164a. In one embodiment, the correct mating orientation is marked on the female coupling housing 164 such as an alignment indicia so that the craftsman can quickly and easily mate preconnectorized cable 100 with the male plug connector 50. For instance, the alignment indicia may be an arrow or dot molded into the female coupling housing 164, however, other suitable indicia may be used. Thereafter, the craftsman engages the internal attachment feature 165 such as internal threads of female coupling housing 164 with the complimentary external threads of male plug connector 50 as best shown in FIG. 6 for making the optical connection shown in FIG. 15.

FIG. 16 is a partial perspective view showing a portion of the connector sleeve 136 having a connector assembly 52 disposed therein. Specifically, FIG. 16 shows body 133 of connector sleeve 136 having connector assembly 52 inserted therein. More specifically, a narrow side of connector body 52a of connector assembly 52 abuts the orientation rail 139 of body 133. Stated another way, orientation rail 139 of body 133 only allows connector assembly 52 to be orientated in one position for assembly. Likewise, the orientation features such as first tab 136b and second tab 136c of connector sleeve 136 only allow the connector sleeve 136 to be orientated in one position for assembly with the female coupling housing 164 having the cooperating female coupling housing orientation features 164b, 164c. Further, the edge stop feature of 164a of female coupling housing 164 only allows the shroud 60 of the OptiTap male plug connector 50 to fully seat with the female hardened fiber optic connector 150 for optical coupling in one orientation by preventing insertion of the larger alignment finger into the female coupling housing 164 past the stop ledge 164*a*. Consequently, the respective connector assemblies 52 of OptiTap male plug connector 50 and female hardened fiber optic connector 150 are arranged in the same predetermined relationship.

Preconnectorized cable 100 may have any suitable length desired; however, preconnectorized cable 100 can have standardized lengths. Moreover, preconnectorized cable 100 may include a length marking indicia for identifying its length. For instance, the length marking indicia may be a marking located on the cable such as a colored stripe or denoted in a print statement. Likewise, the length marking indicia may be a marking located on female hardened connector 150. In one embodiment, length marking indicia may be denoted by a marking on female coupling housing 164 such as a colored stripe. In any event, the length marking indicia should be easily visible so the craftsperson may identify the preconnectorized cable length. By way of example, a red marking indicia on female coupling housing 164 denotes a length of about 50 feet while an orange marking indicia denotes a length of about 100 feet.

The described explanatory embodiment provides an optical connection that can be made in the field between a conventional OptiTap® male plug connector 50 and the female hardened connector 150 disclosed herein without any special tools, equipment, or training. Additionally, the optical connection is easily connected or disconnected by merely mating or unmating the connector on the ends of preconnectorized cable 10 with the female hardened connector assembly 100 by threadly engaging or disengaging the coupling nut on the OptiTap® male plug connector 50 with the attachment features 165 such as internal threads of the female coupling housing of the female hardened connector 150. Thus, the female hardened connectors disclosed allow deployment of a third party network provider to an existing cable assembly having an OptiTap® male plug connector of the subscriber such as in fiber to the location 'x' in an easy and economical manner, thereby providing the end user with an option among service providers. Furthermore, concepts disclosed can be practiced with other fiber optic cables, connectors and/or other preconnectorized cable configurations.

Figure 17:
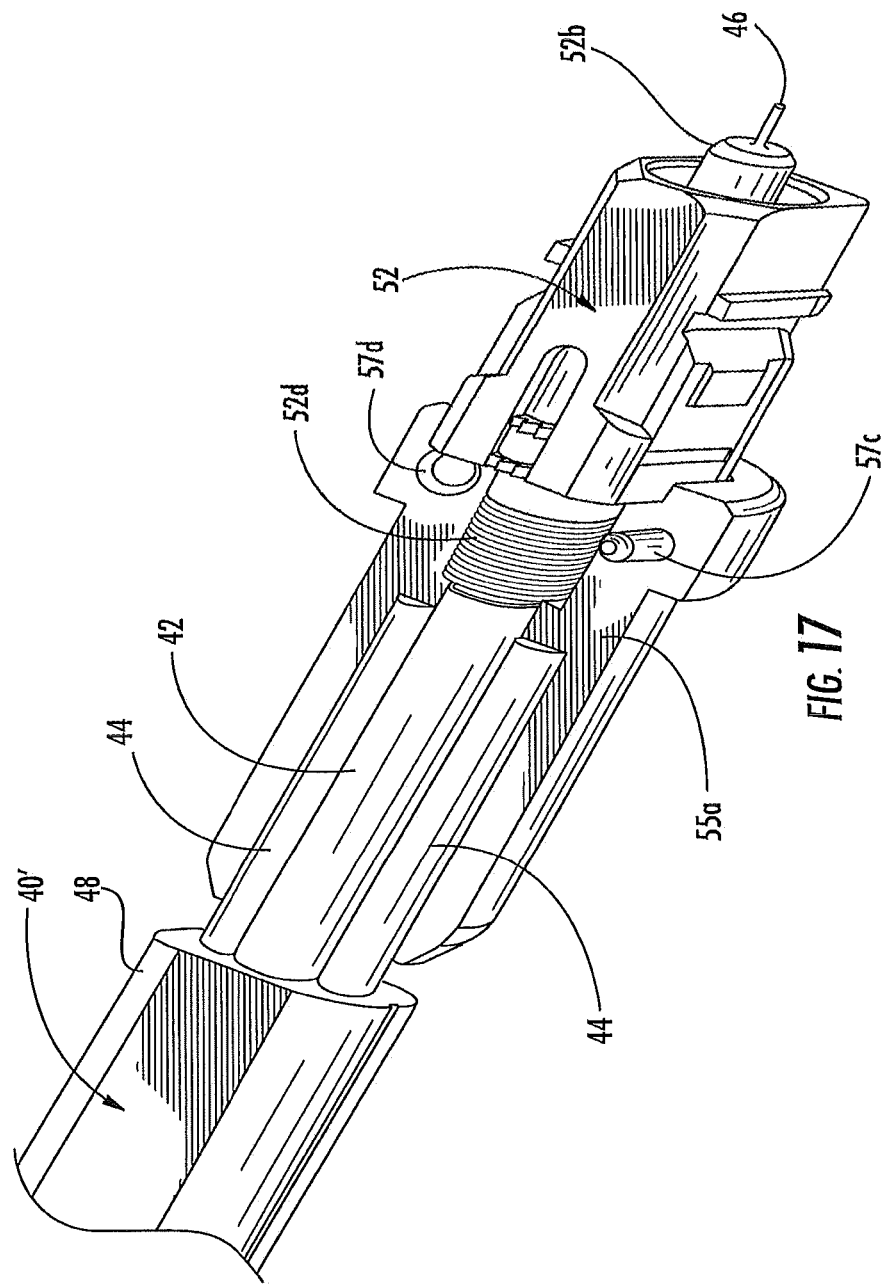
FIGS. 17-19 depict different methods for attaching strength members of fiber optic cables to the crimp body for making cable assemblies.
Figure 18:
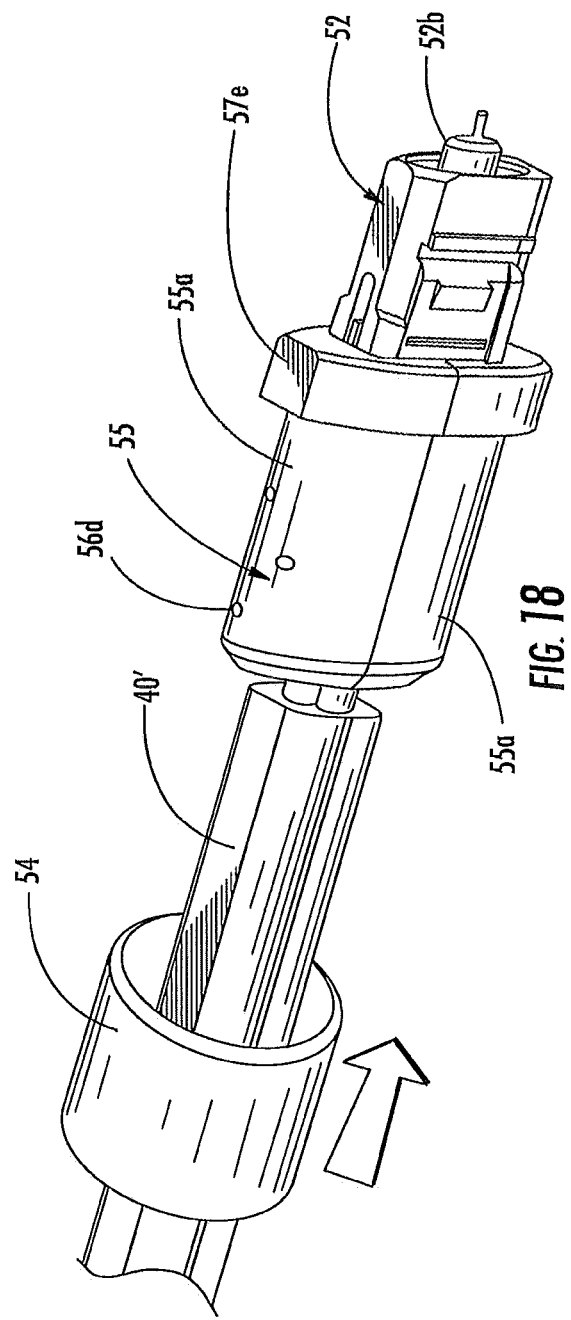
Figure 19:
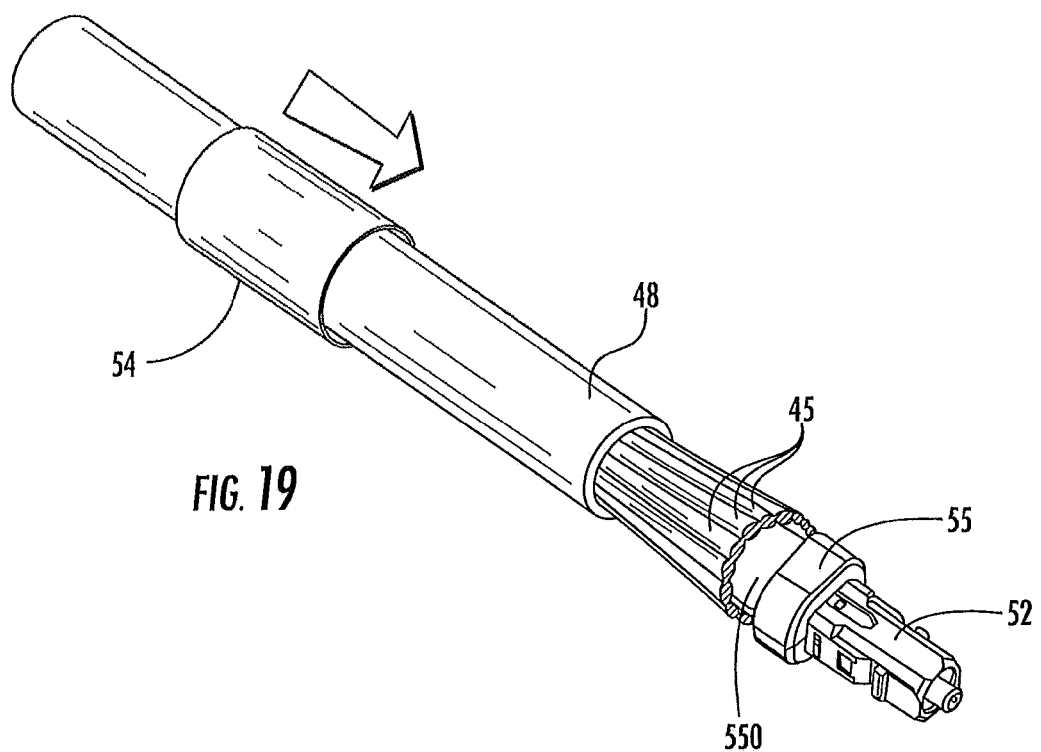

FIGS. 17-19 depict different methods for attaching tensile elements of fiber optic cables to the crimp body 55 for making cable assemblies using female hardened connector 150. The female hardened connectors 150 disclosed herein are advantageous since they may connnectorized various different types of cable constructions such as flat cables or round cables that may have different types of tensile elements. As used herein, the term "strength component" means the strength element has anti-buckling strength, while the term "strength member" means the strength element lacks anti-buckling strength. Furthermore, the term "tensile element" means either a strength component or a strength member. An example of a strength component is a glass-reinforced plastic (GRP) rod and an example of a strength member is a tensile yarn such as Kevlar® or the like.

FIGS. 17 and 18 depict fiber optic cable 40' having one or more strength components 44 such as GRP rods disposed between a first shell 55*a* and a second shell 55*a* of crimp body 55, As shown, cable 40' has the optical fiber attached to the connector assembly 52 and is positioned within a first shell 55*a*. In this explanatory embodiment, cable 40' has a generally flat construction, but may have oval, trilobal or other suitable shapes with an optical component 42 having strength components 44 disposed on opposite sides of the optical component 42, which are generally surrounded by a cable jacket 48. As best shown in FIG. 17, shells 55*a* have recesses or passageways for receiving the strength components 44 therein and a first end for securing connector assembly 52 therebetween. The alignment of shells 55*a* is accomplished by one or more pins 57*e* that fit within one or more complementary bores 57*d* that may be formed in the shells 55*a* or the pins may be discrete components as desired. In advantageous embodiments, the shells can be symmetrical so only one mold is needed for making both shells. FIG. 18 depicts both shells disposed about the strength components 44 of cable 40'. Shells 55*a* may be secured in any suitable manner such as by a crimp band 54 and/or adhesive as desired. Shells 55*a* may also include one or more bores 56*d* so that excess adhesive may escape if used for securing the crimp body 55. As shown, the optional crimp band 54 is slid onto cable 40' prior to placing the cable in the shell 55*a*and then can be slid over the crimp body as represented by e arrow before being deformed about the crimp body.

FIG. 19 depicts another type of cable construction that may be advantageously preconnectorized with the female hardened connector 150 disclosed herein. The fiber optic cable shown has an optical fiber (not visible) attached to the connector assembly 52, a plurality of strength members 45 such as Kevlar® or the like, and a cable jacket 48 having a generally round cross-section. As shown, strength members 45 are disposed about an outer barrel 55*o* of crimp body 55. Thereafter, a crimp band 54 may be slid over the strength members 45 as represented by the arrow so that the strength members 45 are attached between outer barrel of the crimp body 55 and the crimp band 54 is deformed to secure the strength members 45.

Still other cables are possible with the female hardened connector disclosed herein. For instance, cable assemblies disclosed herein may include a fiber optic cable having a subunit surrounded by an upjacketed portion. The subunit includes at least one optical fiber and a plurality of tensile yarns such as Kevlar, fiberglass, or the like disposed within a subunit jacket. In other words, the tensile yarns form a portion of the subunit and are internal to the subunit jacket. The upjacketed portion of fiber optic cable includes strength components such as GRP members having anti-buckling strength disposed about the subunit (i.e., disposed radially outward of the subunit) and within a jacket. In other words, the strength components are disposed on opposite sides of the subunit in a generally linear arrangement. Specifically, the subunit is round and the strength components are disposed on opposite sides of the subunit and jacket has a generally flat profile. Of course, variations on this cable are possible. By way of example, the at least one optical fiber can optionally include a buffer layer with a diameter greater than 250 microns for providing further protection to the optical fiber such as 500, 700 or 900 microns, but other nominal sizes are possible. As another example, the jacket of the upjacketed portion may have other cross-sectional profiles besides generally flat such as round, oval, tri-lobal, etc. Moreover, the female hardened connector may terminate more than one optical fiber.

Using cables with a subunit has advantages. For instance, the subunit of the cable may be broken out from the cable for attaching a second connector to a second end of the subunit. This ability to break-out the subunit and attach a different type of fiber optic connector is advantageous for routing the cable assembly from an indoor location such at the central office and to an outdoor location where a female hardened connector is desired. Simply stated, a portion of subunit is broken-out from the second end of the cable assembly and there is no need to strain-relieve (i.e., attach) the upjacketed portion of the cable since the tensile yarns of the subunit are strain-relieved. Moreover, the subunit provides a much smaller and highly flexible fiber optic cable at the second end of the cable assembly for deployment. Further, any of the embodiments can use any suitable connector assembly such as a SC or a LC connector assembly having a ferrule and a connector housing along with other suitable components.

The strength components of the upjacketed portion are exposed from the upjacketed portion and then disposed between first shell 55a and second shell 55a as described and illustrated. An optional crimp band 54 may be used for securing the shells 55a of crimp body 55 as desired. Additionally, as discussed an adhesive or bonding agent may be used with or without crimp band 54 to attach or secure strength component disposed between shells 55a.

Also, the plurality of tensile yarns of subunit are attached to the crimp body 55. By way of example, some of the plurality of tensile yarns are attached between crimp body and crimp band as discussed herein. In other words, the ends of the tensile yarns are sandwiched/disposed between the outer barrel of the crimp body 55 and crimp band 54 and then the crimp band is secured (i.e., crimped) to strain-relieve the tensile yarns. As desired, the optical fiber of subunit may enter a protective tube at least partially disposed within the crimp body. Simply stated, a buffer layer on optical fiber is threaded through (i.e., enters) a protective tube and at least partially disposed within crimp body 55. Protective tube can have any suitable size, shape and/or length as desired that allows for suitable performance with optical fiber. The buffer layer may also enter the connector assembly 52 as desired, but the subunit jacket does not enter the crimp body 55. Moreover, the geometry of shells 55a of crimp body 55 can be modified for the particular embodiments shown to provide adequate sizing of passageways and the like for the various embodiments.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A female hardened fiber optic connector, comprising:
   a connector assembly;
   a connector sleeve comprising a passageway between a first end and a second end; and
   a female coupling housing comprising a first portion having a front end comprising an opening with an internal attachment feature, wherein the female coupling housing receives a portion of the connector sleeve using one or more pockets in the first portion.

2. The female hardened fiber optic connector of claim 1, wherein the one or more pockets of the female coupling housing comprises a first pocket and a second pocket for receiving a portion of the connector sleeve.

3. The female hardened fiber optic connector of claim 2, wherein the first pocket and the second pocket are disposed on opposite sides of the female coupling housing.

4. The female hardened fiber optic connector of claim 1, wherein the internal attachment feature are threads on an internal surface of the female coupling housing.

5. The female hardened fiber optic connector of claim 1, wherein a portion of the connector assembly is received in the connector sleeve.

6. The female hardened fiber optic connector of claim 1, wherein the connector assembly comprises a ferrule and a connector housing.

7. The female hardened fiber optic connector of claim 1, wherein the female hardened fiber optic connector only allows a complimentary male connector to mating in one direction.

8. The female hardened fiber optic connector of claim 1, wherein the female coupling housing comprises a stop ledge disposed on an inner wall.

9. The female hardened fiber optic connector of claim 1, wherein the female coupling housing is sized for receiving a male connector within the opening for optical mating.

10. The female hardened fiber optic connector of claim 1, further comprising a body.

11. The female hardened fiber optic connector of claim 1, further comprising a crimp band.

12. The female hardened fiber optic connector of claim 1, being a portion of a cable assembly further comprising a fiber optic cable attached to the hardened fiber optic connector.

13. The female hardened fiber optic connector of claim 12, wherein the fiber optic cable comprises at least one strength member secured to a cable attachment region.

14. The female hardened fiber optic connector of claim 12, a tensile element of the fiber optic cable being at least one tensile yarn attached to a portion of the female hardened fiber optic connector.

15. The female hardened fiber optic connector of claim 12, wherein the fiber optic cable has an optical fiber comprising a buffer layer.

16. The female hardened fiber optic connector of claim 12, the cable assembly further includes a boot.

17. A method of making a hardened fiber optic connector assembly, comprising the steps of:
   providing a fiber optic cable having at least one optical fiber;
   providing a female hardened fiber optic connector comprising a connector assembly, a connector sleeve and a female coupling housing comprising a first portion having a front end comprising an opening with an internal attachment feature, wherein the connector sleeve comprises a passageway between a first end and a second end;
   positioning the connector sleeve within the female coupling housing such that the female coupling housing receives a portion of the connector sleeve using one or more pockets in the first portion;
   attaching the at least one optical fiber to the connector assembly; and
   positioning a portion of the connector assembly in the connector sleeve.

18. The method of claim 17, wherein the one or more pockets of the female coupling housing comprises a first pocket and a second pocket for receiving a portion of the connector sleeve.

19. The method of claim 18, wherein the first pocket and the second pocket are disposed on opposite sides of the female coupling housing.

20. The method of claim 17, wherein the internal attachment feature are threads on an internal surface of the female coupling housing.

21. The method of claim 17, wherein the connector assembly comprises a ferrule and a connector housing.

22. The method of claim 17, wherein the connector assembly is keyed to the female coupling housing.

23. The method of claim 17, wherein the female coupling housing comprises a stop ledge disposed on an inner wall.

24. The method of claim 17, wherein the female coupling housing is sized for receiving a male connector within the opening for optical mating.

25. The method of claim 17, further comprising a body.

26. The method of claim 17, further comprising a crimp band.

27. The method of claim 17, wherein the fiber optic cable comprises at least one strength member secured to a cable attachment region.

28. The method of claim 17, a tensile element of the fiber optic cable being at least one tensile yarn attached to a portion of the female hardened fiber optic connector.

29. The method of claim 17, wherein the fiber optic cable has an optical fiber comprising a buffer layer.

30. The method of claim 17, the cable assembly further includes a boot.

31. A female hardened fiber optic connector, comprising:
a connector assembly;
a connector sleeve comprising a passageway between a first end and a second end; and
a female coupling housing comprising an opening with an internal attachment feature, wherein the female coupling housing receives a portion of the connector sleeve using one or more pockets.

32. The female hardened fiber optic connector of claim 31, wherein the one or pockets of the female coupling housing comprises a first pocket and a second pocket for receiving a portion of the connector sleeve.

33. The female hardened fiber optic connector of claim 32, wherein the first pocket and the second pocket are disposed on opposite sides of the female coupling housing.

34. The female hardened fiber optic connector of claim 31, wherein the internal attachment feature are threads on an internal surface of the female coupling housing.

35. The female hardened fiber optic connector of claim 31, wherein a portion of the connector assembly is received in the connector sleeve.

36. The female hardened fiber optic connector of claim 31, wherein the connector assembly comprises a ferrule and a connector housing.

37. The female hardened fiber optic connector of claim 31, wherein the female hardened fiber optic connector only allows a complimentary male connector to mating in one direction.

38. The female hardened fiber optic connector of claim 31, wherein the female coupling housing comprises a stop ledge disposed on an inner wall.

39. The female hardened fiber optic connector of claim 31, wherein the female coupling housing is sized for receiving a male connector within the opening for optical mating.

40. The female hardened fiber optic connector of claim 31, being a portion of a cable assembly further comprising a fiber optic cable attached to the hardened fiber optic connector.

41. A female hardened fiber optic connector, comprising:
a connector assembly;
a connector sleeve comprising a passageway between a first end and a second end; and
a female coupling housing comprising a first portion having a front end comprising an opening with an internal attachment feature comprising threads on an internal surface of the female coupling housing, wherein the female coupling housing receives a portion of the connector sleeve using one or more pockets in the first portion.

42. The female hardened fiber optic connector of claim 41, wherein the one or more pockets of the female coupling housing comprises a first pocket and a second pocket for receiving a portion of the connector sleeve.

43. The female hardened fiber optic connector of claim 42, wherein the first pocket and the second pocket are disposed on opposite sides of the female coupling housing.

44. The female hardened fiber optic connector of claim 41, wherein a portion of the connector assembly is received in the connector sleeve.

45. The female hardened fiber optic connector of claim 41, wherein the connector assembly comprises a ferrule and a connector housing.

46. The female hardened fiber optic connector of claim 41, wherein the female hardened fiber optic connector only allows a complimentary male connector to mating in one direction.

47. The female hardened fiber optic connector of claim 41, wherein the female coupling housing comprises a stop ledge disposed on an inner wall.

48. The female hardened fiber optic connector of claim 41, wherein the female coupling housing is sized for receiving a male connector within the opening for optical mating.

49. The female hardened fiber optic connector of claim 41, being a portion of a cable assembly further comprising a fiber optic cable attached to the hardened fiber optic connector.

50. A female hardened fiber optic connector, comprising:
a connector assembly;
a connector sleeve comprising a passageway between a first end and a second end; and
a female coupling housing comprising an opening with an internal attachment feature comprising threads on an internal surface of the female coupling housing, wherein the female coupling housing receives a portion of the connector sleeve using one or more pockets.

51. The female hardened fiber optic connector of claim 50, wherein the one or more pockets of the female coupling housing comprises a first pocket and a second pocket disposed on opposite sides of the female coupling housing for receiving a portion of the connector sleeve.

52. The female hardened fiber optic connector of claim 50, wherein a portion of the connector assembly is received in the connector sleeve.

53. The female hardened fiber optic connector of claim 50, wherein the connector assembly comprises a ferrule and a connector housing.

54. The female hardened fiber optic connector of claim 50, wherein the female hardened fiber optic connector only allows a complimentary male connector to mating in one direction.

55. The female hardened fiber optic connector of claim 50, wherein the female coupling housing comprises a stop ledge disposed on an inner wall.

56. The female hardened fiber optic connector of claim 50, wherein the female coupling housing is sized for receiving a male connector within the opening for optical mating.

57. The female hardened fiber optic connector of claim 50, being a portion of a cable assembly further comprising a fiber optic cable attached to the hardened fiber optic connector.

\* \* \* \* \*

UNITED STATES PATENT AND TRADEMARK OFFICE
CERTIFICATE OF CORRECTION

PATENT NO. : 11,036,010 B2
APPLICATION NO. : 15/954007
DATED : June 15, 2021
INVENTOR(S) : Robert Elvin Barnette, Jr. et al.

Page 1 of 1

It is certified that error appears in the above-identified patent and that said Letters Patent is hereby corrected as shown below:

In the Specification

In Column 1, Line 13, delete "U.S.C," and insert -- U.S.C. --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*